(12) United States Patent
Lewane et al.

(10) Patent No.: US 12,391,837 B2
(45) Date of Patent: Aug. 19, 2025

(54) COMPOSITE PARTICLES FOR WATER-BASED COATING COMPOSITIONS

(71) Applicant: SWIMC LLC, Cleveland, OH (US)

(72) Inventors: Jennifer E. Lewane, Cleveland, OH (US); Mark A. Wasil, Cleveland, OH (US); Luke Kazmier, Cleveland, OH (US); Milos Sunjevaric, Cleveland, OH (US); Jean-Dominique Turgis, Nantes (FR); Tony A. Rook, Cleveland, OH (US)

(73) Assignee: SWIMC LLC, Cleveland, OH (US)

( * ) Notice: Subject to any disclaimer, the term of this patent is extended or adjusted under 35 U.S.C. 154(b) by 0 days.

(21) Appl. No.: 18/659,269

(22) Filed: May 9, 2024

(65) Prior Publication Data

US 2024/0301216 A1 Sep. 12, 2024

Related U.S. Application Data

(63) Continuation of application No. PCT/US2022/079697, filed on Nov. 11, 2022.

(60) Provisional application No. 63/278,558, filed on Nov. 12, 2021.

(51) Int. Cl.
| | |
|---|---|
| *C09D 5/02* | (2006.01) |
| *C09D 5/14* | (2006.01) |
| *C09D 7/40* | (2018.01) |
| *C09D 7/62* | (2018.01) |
| *C09D 133/04* | (2006.01) |

(52) U.S. Cl.
CPC ............ *C09D 5/028* (2013.01); *C09D 5/022* (2013.01); *C09D 5/025* (2013.01); *C09D 5/14* (2013.01); *C09D 7/62* (2018.01); *C09D 7/68* (2018.01); *C09D 7/69* (2018.01); *C09D 133/04* (2013.01)

(58) Field of Classification Search
CPC ........ C09D 5/028; C09D 5/022; C09D 5/025; C09D 5/14; C09D 7/62; C09D 7/68; C09D 7/69; C09D 133/04
USPC .......................................................... 428/467
See application file for complete search history.

(56) References Cited

U.S. PATENT DOCUMENTS

| | | | |
|---|---|---|---|
| 2007/0036903 A1 | 2/2007 | Mayr et al. | |
| 2011/0195099 A1* | 8/2011 | Nolte ..................... | C08J 3/128 |
| | | | 428/407 |
| 2023/0140735 A1* | 5/2023 | Scheerder ............... | C09D 7/42 |
| | | | 524/501 |
| 2024/0132738 A1* | 4/2024 | Shimanaka ............ | C09D 11/03 |

FOREIGN PATENT DOCUMENTS

| | | |
|---|---|---|
| CN | 103709910 A | 4/2014 |
| CN | 106433417 A | 2/2017 |
| CN | 107880735 A | 4/2018 |
| CN | 115011183 A | 9/2022 |
| JP | S5632237 A | 4/1981 |
| JP | 2007-508415 A | 4/2007 |
| JP | 2009-249189 A | 10/2009 |
| JP | 2011-079941 A | 4/2011 |
| JP | 2012031223 A | 2/2012 |
| JP | 2020-186180 A | 11/2020 |
| WO | WO-2021090841 A1 * | 5/2021 |

OTHER PUBLICATIONS

Machine translation of WO 2021/090841 A1 (Year: 2021).*
King Honor, "Differences and Substitutes of Fischer Tropsch Wax and Paraffin Wax", Sep. 23, 2023, at https://www.khonorwax.com/differences-and-substitutes-of-fischer-tropsch-wax-and-paraffin-wax.html#:~: text=fischer%20tropsch%20wax%20is%20derived,is% 2085%25%20to%2090%25 (Year: 2023).*
International Preliminary Report on Patentability issued in Application No. PCT/US2022/079697 mailed May 23, 2024, 6 pages.
International Search Report and Written Opinion issued in Application No. PCT/US2022/079697 mailed Mar. 20, 2023, 8 pages.
Quing, Yong-quan, "Simple method for preparing ZnO superhydrophobic surfaces with micro/nano roughness", Journal of Adhesion Science and Technology, 2015, vol. 29, No. 20, pp. 2153-21597.

* cited by examiner

*Primary Examiner* — Callie E Shosho
*Assistant Examiner* — Steven A Rice
(74) *Attorney, Agent, or Firm* — Honigman LLP

(57) ABSTRACT

A waterborne coating composition which includes a film-forming binder and composite particles comprising wax and a metal oxide, such as wax encapsulated zinc oxide, provides enhanced mildew resistance.

26 Claims, No Drawings

COMPOSITE PARTICLES FOR WATER-BASED COATING COMPOSITIONS

REFERENCE TO OTHER APPLICATIONS

This Application is a Continuation of Application PCT/US2022/079697 filed on Nov. 11, 2022, which claims priority to U.S. Provisional Patent Application 63/278,558 filed on Nov. 12, 2021. The entire contents of both applications are incorporated herein by reference in their entirety.

FIELD

This application generally relates to compositions for water-based coating compositions and, in particular, water-based coating compositions including functional composite particles.

BACKGROUND

Coating compositions suitable for architectural paints and stains tend to be complex mixtures of ingredients including pigments, resins/binders, solvents, surfactants, extenders, and other functional additives. Such coatings may be applied to a variety of substrates including wood, metals, masonary, or drywall to suggest but a few typical substrates. The compositions for the coatings may vary depending on the application, but one conventional functional additive for such coating compositions is often zinc oxide, which may function as a an extender, a corrosion inhibitor, a UV absorber, and/or a stain blocker in the composition. In some instances, zinc oxide may also enhance the effectiveness of other mildewstats present in the coating composition. Other metal oxides, such as silver oxide or magnesium oxide, also may be included as antimicrobial agents.

However, a shortcoming of zinc oxide in coating compositions, particularly coating compositions exposed to UV and moisture from external environments, is that any impact of the zinc oxide over time is often degraded. Zinc oxide, in some instances, can be solubilized leading to the zinc oxide leaching from an applied coating. In such instances, any functional benefit of the zinc oxide including mildew inhibition and/or any synergies with other mildewstats is lessened. As increased coating lifetime coatings is a desirable characteristic, inclusion in a coating composition of a metal oxide component with improved effectiveness over time is desirable.

SUMMARY

In one aspect, a waterborne coating composition is disclosed which comprises a film-forming binder resin and composite particles that include one or more waxes and an metal oxide selected from the group of zinc oxide, magnesium oxide, and silver oxide. The composite particles are present in the water-based coating composition at a concentration of about 10 to about 25 lb/gallon. The coating composition also comprises a pigment present in an amount of 3 to about 60 PVC, preferably about 10 to about 50 PVC, more preferably about 20 to about 45 PVC. In some approaches, the metal oxide is zinc oxide, and in other approaches, the metal oxide is silver oxide or magnesium oxide. In some approaches, the wax may be selected from Carnauba wax, beeswax, rice bran wax, montan wax, paraffin wax, microcrystalline paraffin wax, polyethylene wax, polypropylene wax, Fischer-Tropsch paraffin wax, diketone wax, calcium stearate, magnesium stearate, zinc stearate, aluminum stearate, derivatives thereof, and mixtures thereof.

Also disclosed is a coated substrate comprising A coated substrate comprising a coating cured from the coating composition of the present disclosure applied directly or indirectly on a substrate selected from the group consisting of wood, aluminum, steel, concrete, masonry, siding, and drywall.

This Summary is not intended to be limiting. The waterborne coating composition and coated substrate of the present disclosure may be combined with one or more optional aspects as further disclosed herein.

DETAILED DESCRIPTION

The present disclosure provides a waterborne coating composition including a film-forming binder resin and composite particles including one or more waxes and an metal oxide selected from zinc oxide, magnesium oxide, or silver oxide. It has surprisingly been found that the effective life of the metal oxide on a coating composition can be extended by incorporating the metal oxide in a composite particle with wax.

The composite particles of the coating compositions herein provide a discrete particulate matter that enhances the ability of any metal oxide of the coatings to remain in the films for an extended period of time providing, for instance, enhanced or extended resistance to mildew or fungal growth. The composite particles, in general, include one or more waxes that may be any organic wax-based material incompatible with and/or insoluble with the one or more binder resins of the coating compositions. As such, in preferred embodiments, the composite particles herein remain as discrete particles within the formed films or coating layer(s) after all coating, drying, and/or curing steps are completed. In approaches, the metal oxide of the composite particles herein may be selected from a zinc oxide, magnesium oxide, or silver oxide and with zinc oxide being preferred.

Wax of the Composite Particles. In approaches, the composite particles include a wax. The wax is any organic material that is insoluble with or incompatible with the one or more binder resins of the coating compositions such that the composite particles remain as discrete particles within a formed coating after all coating, drying, and/or curing steps are completed. In some embodiments or other approaches, the wax remains insoluble in water and/or xylene and, in this context, insoluble refers to a solubility of the wax in water at 25° C. of less than 10 mg/liter, preferably less than 5 mg/liter, and more preferably, less than 1 mg/liter, and/or a solubility of the wax in xylene at 50° C. of less than 1 g/liter, preferably less than 500 mg/liter, and more preferably, less than 100 mg/liter. The aforementioned solubility ranges include zero—that is, no trace amount of solubility is required.

In some approaches, a suitable wax for the composite particles may be, in general, any organic material that is largely lipophilic with a melting point of at least about 40° C. and that is insoluble in water (as defined above) but generally soluble in organic and/or nonpolar solvents. In some approaches, suitable waxes are organic compounds of aliphatic alkyl chains (at least 10 or more carbons, 35 or more carbons, 50 or more carbons and, in some instance, up to 100 or more carbons), although aromatic substitution may also be present in some forms of the wax. In other approaches, exemplary waxes may contain unsaturated bonds and include various functional groups, such as fatty acids, alcohols, ketones, aldehydes and/or fatty acid esters, and the like as needed for a particular application or functionality. Waxes may be natural or synthetic, and synthetic waxes may include aliphatic hydrocarbons (alkanes or paraffin)

In other approaches, suitable waxes for the composite particles herein may be selected from (i) esters of fatty acids with fatty alcohols, fatty aldehydes, fatty triterpene alcohols, fatty steroid alcohols, or mixtures thereof; (ii) polyolefin waxes, (iii) fatty amides; (iv) metal esters of fatty acids; (v) derivatives thereof, or (vi) mixtures thereof. The compounds or molecules forming the wax may have 16 or more carbons, preferably 35 or more carbons, more preferably 50 or more carbons, and even more preferably 100 or more carbons. The upper end of carbons in the wax compound or molecule is not particularly limited, but may be 500 or less, 400 or less, 200 or less, or 150 or less carbons. In approaches, suitable waxes or derivatives thereof may have a drop melting point of about 60° C. to about 200° C. as measured by ASTM D127, preferably about 65° C. to about 200° C., and more preferably, about 70° C. to about 150° C. In approaches, suitable waxes or derivatives thereof have a Tfusion from about 70° C. to about 160° C., preferably from about 100° C. to about 150° C., and more preferably from about 105° C. to about 120° C.

Exemplary waxes thereof that may be used for the composite particles herein include, but are not limited to, Carnauba wax, beeswax, rice bran wax, ethylene butyl styramide wax, polyamide, wax, polyester wax, montan wax, paraffin wax, microcrystalline paraffin wax, polyethylene wax, polypropylene wax, Fischer-Tropsch paraffin wax, diketone wax, calcium stearate, magnesium stearate, zinc stearate, aluminum stearate, derivatives thereof, or mixtures thereof. In some approaches, the wax may be substantially free-of and preferably free-of any per- and/or poly-fluoroalkyl substances (PFAS). In preferred embodiments, the waxes herein are also preferably free of fluorine components or fluorine substituents. In yet other approaches, any of the waxes herein may be a bio-based material that is bio-sourced or bio-derived and may include non-petrochemical-based materials. In other approaches, the bio-based materials may be sourced from renewable processes and/or prepared from natural or renewable biological resources. In preferred approaches, the wax is rice bran wax, carnauba wax, ethylene butyl styramide wax, polyamide wax, polyethylene wax, or a polyester wax.

In some optional approaches, the selected wax of the composite particles herein enables the composite particles, in some circumstances, to migrate (at least in part) to a coating interface (that is, a top or bottom surface area or surface region of a coating or coating layer) during the application, drying, or curing of the coating. Such migration allows the composite particles, in some optional circumstances, to accumulate at the interface or surface region, creating interfacial layers or zones of a coating enriched in the composite particles. This migration effect may also help reducing the overall amount of particles used. Thus, the cured coatings herein may have an enrichment or a concentration of the composite particles at a coating interface or at least within a surface region of a dried coating that is greater than a concentration of the composite particles within a central region (e.g., substantially diffused throughout therein) of the respective dried coating.

While not wishing to be bound by theory, it is believed that the disclosed metal oxides, when incorporated in a composite particle, maintain their properties for a longer time compared to metal oxides that are separate from the composite particles for one or more reasons. It is believed that, following application of the coating composition to a substrate, composite particles migrate to the surface of an applied, cured coating slower compared to a metal oxide that is not part of a composite particle. In addition, it is believed that metal oxide within composite particles becomes available over an extended time period as the wax component of a composite particle breaks down or deteriorates during the coating lifetime. Thus, it has been discovered that inclusion of metal oxides within a composite particle effectively extends the duration of the metal oxide's functional effectiveness in the coating relative to metal oxides that are separate from the composite particles.

As used herein, a coating interface or surface region of a cured coating generally refers to an area or region that has a relative thickness generally extending perpendicularly from the surface of the cured coating to a depth of less than about 0.5 microns beneath a top surface of a respective coating such as, for example, an average such depth of about 0.2 to about 0.5 microns. The interface or surface region enriched with the composite particles may be compared to the central region that has less of the composite particles relative to the interface or surface region. As used herein, the central region of any cured composition generally refers to another portion of the coating layer which extends beneath the surface region/interface noted above.

The concentration of composite particles in either the surface region/interface relative to the central region of a cured coating can be characterized in a variety of ways including, but not limited to, a particle density such as an average number density of particles (for instance, the average number of particles per unit volume) in the surface region being greater than the average number density in the central region. The concentration of particles in a region of a cured coating can be determined, for instance, by a variety of surface analysis techniques known in the art including Transmission Electron Microscopy (TEM), Scanning Electron Microscopy (SEM), Atomic Force Microscopy (AFM), and/or X-ray Photoelectron Spectroscopy, and the like techniques. Preferably, SEM may be used to determine any concentration of the composite particles.

In some optional approaches, the wax may be a material or melt-blend of materials. For example, wax blends may be formed from individual waxes by way of solubility, melting, melt-blending, and/or co-melting during the manufacturing, storage, drying, or curing of the full coating composition, or by wet chemistry within the coating during the application or curing steps of the film. Such involuntary but naturally produced blends and/or so-called alloys of wax materials, such as the waxes of the composite particle, may be contemplated by the composite particles and wax components thereof.

Metal Oxide Particles. The composite particles herein further include one or more metal oxides, and preferably, metal oxide particles as the inorganic material. In some approaches, the metal oxide particles are encapsulated or embedded within the wax of the composite particles. In some approaches, the metal oxide of the composite particles herein includes zinc, magnesium, or silver and preferably, is a metal oxide thereof such as zinc oxide, magnesium oxide, or silver oxide. Preferably, the metal oxide is zinc oxide. In optional approaches, the metal oxide may be doped (e.g., admixed) with various other metals and/or metal oxides as needed for a particular application. Such doped oxides, for instance a potassium-doped zinc oxide may also be used as needed for a particular application.

In some approaches, the inorganic substance for the composite particles is a metal oxide particulate material with a high surface area, such as small particles and/or particles having a tortuous or porous microstructure. As noted above, the metal oxide may be concentrated or arranged within the coating into a thin and concentrated protective layer, in some approaches, the furthest possible away from the coating/substrate interface (i.e., near and/or at the coating surface). In some embodiments, the metal oxide for the composite particles may have a distribution of particle sizes greater than 100 nm, preferably at least 150 nm, and more preferably, at least about 200 nm as measured by laser diffraction. In other approaches, the metal oxide has a distribution of particle sizes smaller than the diameter of the composite particles, and in some instance, a particle size distribution of about 2 microns or less, preferably about 1.8 microns or less, and more preferably about 1 microns or less as measured by laser diffraction. The metal oxide may also have a high surface area of at least about 1 m2/g as determined by ASTM D3037, preferably at least about 3 m2/g, and more preferably at least about 10 m2/g to about 50 m2/g. Although the upper surface area is not restricted, typically the inorganic substance will have a surface are of 50 m2/g or less as determined by ASTM D3037. Thus, in some embodiments, the inorganic substance has a surface of at least about 1 m2/g to about 50 m2/g, preferably at least about 3 m2/g to about 50 m2/g, and more preferably at least about 10 m2/g to about 50 m2/g, as determined by ASTM D3037. The aforementioned surface area is conveniently measured for the inorganic substance feedstock prior to formation of the composite particles, or, in some instances, is supplied by the supplier and/or manufacturer of the metal oxide or composite particles.

The particle sizes referred to herein may be determined by laser diffraction particle size analysis using a Beckman Coulter LS 230 Laser Diffraction Particle Size Analyzer or equivalent, calibrated as recommended by the manufacturer. Particle size distribution and/or the particle size "D-values" (e.g., D10, . . . . D50, D90, D95, and D99) are the particle sizes which divide a sample's volume into a specified percentage when the particles are arranged on an ascending particle size basis. For example, for particle size distributions the median is called the D50 (or x50 when following certain ISO guidelines). The D50 is the particle size in microns that splits the distribution with half above and half below this diameter. The Dv50 (or Dv0.5) is the median for a volume distribution. The D90 describes the particle size where ninety percent of the distribution has a smaller particle size and ten percent has a larger particle size. The D95 describes the particle size where ninety five percent of the distribution has a smaller particle size and five percent has a larger particle size. The D99 describes the particle size where ninety nine percent of the distribution has a smaller particle size and one percent has a larger particle size. Unless specified otherwise herein, D50, D90, D95, and D99 refer to Dv50, Dv90, Dv95, and Dv99, respectively. The D-values specified herein may be determined by laser diffraction particle size analysis.

Samples for laser diffraction particle size analysis can be prepared, for example, by diluting the samples in a substantially non-swelling solvent (such as cyclohexanone or 2-butoxyethanol) and shaking them until evenly dispersed. The choice of a suitable solvent will depend upon the particular particles to be tested. Solvent screening tests may need to be conducted to identify a suitable substantially non-swelling solvent. By way of example, a solvent in which a polymer particle swells by about 1% or less (as determined by laser diffraction particle size analysis) would be considered a substantially non-swelling solvent.

Composite Particles. The composite particles include the above-described metal oxide and a selected wax or wax blend. Preferably, the amount and size of the metal oxide relative to the amount of wax and overall composite particle size results in the composite particles being fully or substantially encapsulated, with substantial encapsulation meaning that the particles have little to no amount of metal oxide present or exposed on the surface of the composite particles.

In some embodiments, the composite particles herein may include at least about 30 weight percent of the metal oxide particles based on the total weight of the composite particles, preferably at least about 50 weight percent, and more preferably, at least about 70 weight percent. In other embodiments, the composite particles may include about 90 weight percent or less of the metal oxide particles based on the total weight of the composite particles, and preferably about 80 weight percent or less.

In some approaches, the composite particles may include at least about 10 weight percent of the wax based on the total weight of the composite particles, preferably at least about 20 weight percent, and more preferably, at least about 25 weight percent of the wax. In other embodiments, the composite particles include about 70 weight percent or less of wax based on the total weight of the composite particles, and preferably about 50 weight percent or less, and more preferably about 30 weight percent or less of the wax.

The composite particles have an average particle size larger than the average particle size of the metal oxide. Preferably, the composite particles are present in a particle size distribution having a D50 (and preferably a D90) of less than about 15 microns, preferably less than about 10 microns, even more preferably less than 5 microns, and even more preferably less than about 3 microns. In approaches, the composite particles herein have a particle size distribution ranging from a D10 at least about 0.3 microns to a D90 of about 15 microns or less, preferably a D10 of at least about 0.5 microns to a D90 of about 10 microns or less, and more preferably, a D10 of at least about 1 micron to a D90 of about 3 microns or less, and wherein the inorganic sulfur-species scavenging component is smaller than the size of the composite particles. Particle size may be determined using the techniques as discussed above.

In yet other approaches, the amount of metal (e.g., zinc and, in particular zinc (2+)) provided by the composite particles herein is such that the coating compositions, when dried, have about up to about 10 weight percent of the metal oxide, up to about 8 weight percent of the metal oxide, up to about 6 weight percent, or even up to about 4 weight percent of the metal oxide and preferably, about 0.01 to about 10 weight percent of the metal oxide or other ranges within the above noted amounts, and more preferably, about 0.1 to about 5 weight percent as measured on a non-volatile portion of the coating composition. As noted previously, the concentration of metal oxide may be enriched at the interface and/or surface regions of a particular coating layer. Preferably, the metal is zinc in the composite particles and, more preferably, zinc oxide.

The composite particles may be prepared using any known techniques for forming a composite particle with a wax. In one approach, the composite particles may be formed by spray drying, precipitating, cryogenic freezing, micronizing, and the like techniques from a medium including an admixture of the particular inorganic substance and the wax. Suitable mixing, extrusion, co-extrusion techniques may be used to blend the inorganic substance and the wax. If needed, the admixture of the materials used to form the composite particles may further include other additives or ingredient such as emulsifiers, wetting agents, antioxidants, stabilizers, neutralizing agents, catalysts, thickeners, dispersants, biocides or the like, and mixtures thereof depending on the particular applications and/or circumstances of the blending and mixing. In some approaches, composite particles may be prepared by emulsion melt blending such as combining metal oxide and the wax in water with a suitable emulsifier and heat above the melting temp of the wax while agitating. Then, the mixture is ultimately cooled down and the wax composite particles are present in the liquid as solid particles.

In some approaches, the composite particles herein are configured to remain as discrete particles in the water-based coating composition upon storage at 120° F. for up to 8 weeks and/or as discrete particles in the dried film.

In some approaches, the coating composition includes about 2 to about 26 lb/gallon of zinc oxide in the composite particles.

Metal Oxide Separate from Composite Particles. The waterborne coating compositions herein may include additional metal oxide that is not associated or encapsulated with the composite particles (i.e. not part of the composite particle). Suitable metal oxide particles are available from Umicore Marketing SVC USA, Enverzinc USA Inc., and Zinc Internacional SA. In such approaches, the water-based coating compositions herein may include about 2 to about 26 lb/100 gallon of zinc oxide in the composite particles and about 0 to about 30 lb/100 gallons of zinc oxide separate from the composite particles, preferably about 10 to about 27 lb/100 gallons of zinc oxide, and preferably about 15 to about 30 lb/100 gallons zinc oxide separate from the composite particles. In other approaches and when the coating compositions herein include zinc oxide in both the composite particles and separate from the composition, the coating compositions may have a weight ratio of zinc oxide in the composite particles to zinc oxide separate from the composite particles of about 1:7 to about 2:3 preferably from about 1:4 to about 2:3, and even more preferably about 1:3 to 1:2.

In some approaches, the coating composition includes about 0 to about 25 lb/gallon of zinc oxide in the composite particles.

In some approaches, the amount of metal oxide separate from the composite particles, and the amount of metal oxide within the composite particles is provided such that the total amount of zinc oxide present in the coating composition is at most 50 lbs/100 gallons, or at most 40 lbs/100 gallons, or at most 30 lbs/100 gallons, or at most 20 lbs/100 gallons.

Film Forming Binder Resin. The coating compositions herein also include at least one film-forming binder or film-forming binder resin. In some approaches, the film-forming binder is an acrylic, styrene acrylic, or vinyl acrylic polymer or copolymer and/or blends thereof including ethylenically unsaturated monomers with at least carboxylic acid, alkyl acrylate, alkyl methacrylate, or acetate moieties. The copolymer may include as polymerizable units in a polymer backbone vinyl monomers and acrylic monomers such as at least vinyl acetate, alkyl acrylate, alkyl methacrylate, acrylic, styrene acrylic, and combinations thereof. Alkyl groups of the monomers may have linear or branched chain lengths from C1 to C8 and, in some approaches, are ethyl, propyl, isopropyl, butyl, ethyl hexyl, and the like side groups.

In some approaches, vinyl monomers are selected from the group consisting of vinyl esters, vinyl aromatic hydrocarbons, vinyl aliphatic hydrocarbons, vinyl alkyl ethers and mixtures thereof. Examples of vinyl esters that may be used include vinyl acetate, vinyl propionate, vinyl laurate, vinyl pivalate, vinyl nonanoate, vinyl decanoate, vinyl neodecanoate, vinyl butyrates, vinyl benzoates, and vinyl isopropyl acetates. Examples of vinyl aromatic hydrocarbons that may be used include styrene, methyl styrenes and other lower alkyl styrenes, chlorostyrene, vinyl toluene, vinyl naphthalene and divinyl benzene. Examples of vinyl aliphatic hydrocarbons that may be used include vinyl chloride and vinylidene chloride as well as alpha olefins such as ethylene, propylene, isobutylene, as well as conjugated dienes such as 1,3 butadiene, methyl-2-butadiene, 1,3-piperylene, 2,3-dimethyl butadiene, isoprene, cyclohexene, cyclopentadiene, and dicyclopentadiene. Examples of vinyl alkyl ethers that may be used include methyl vinyl ether, isopropyl vinyl ether, n-butyl vinyl ether, and isobutyl vinyl ether.

Acrylic monomers suitable for use in the present compositions may include any compounds having acrylic functionality. Suitable acrylic monomers are selected from the group consisting of alkyl (meth)acrylates, acrylic acids, as well as aromatic derivatives of (meth)acrylic acid, acrylamides, acrylonitrile, or combinations thereof. Typically, the alkyl (meth)acrylate monomers (also referred to herein as "alkyl esters of (meth)acrylic acid") will have an alkyl ester portion containing from 1 to 12, in some approaches, about 1 to 8, in yet other approaches, about 1 to 6, and in yet further approaches, 1 to 4, carbon atoms per molecule.

Suitable acrylic monomers in the primary binder include, for example, methyl (meth)acrylate, ethyl (meth)acrylate, butyl (meth)acrylate, propyl (meth)acrylate, 2-ethyl hexyl (meth)acrylate, cyclohexyl (meth)acrylate, decyl (meth) acrylate, isodecyl (meth)acrylate, benzyl (meth)acrylate, isobornyl (meth)acrylate, neopentyl (meth)acrylate, 1-adamatyl methacrylate and various reaction products such as butyl, phenyl, and cresyl glycidyl ethers reacted with (meth) acrylic acid, hydroxyl alkyl (meth)acrylates, such as hydroxyethyl and hydroxypropyl (meth)acrylates, amino (meth)acrylates, as well as acrylic acids such as (meth) acrylic acid, ethacrylic acid, alpha-chloroacrylic acid, alpha-cycanoacrylic acid, crotonic acid, beta-acryloxy propionic acid, and beta-styryl acrylic acid.

In some approaches, the acrylic polymer of the primary binder may include substantial amounts of a vinyl acetate monomer. The acrylic copolymer may also include about 90 to about 100 weight percent of linear or branched alkyl acrylate or alkyl methacrylate monomer, and in other approaches, about 94 to about 100 weight percent of a linear or branched alkyl acrylate or alkyl methacrylate monomer. In some approaches, the copolymer may further include substantial amounts of acrylic acid monomer.

The film-forming binder may also include optional ketone-functional vinyl monomer units. In some approaches, these monomer units may be derived from diacetone acrylamide, diacetone (meth)acrylamide, acetoacetoxyethyl (meth)acrylate, acrolein, methacrolein, vinylacetoacetate, crotonaldehyde, 4-vinylbenzaldehyde, vinyl alkyl ketones, acrylamide-pivalaldehyde, methacrylamidopivalaldehyde, 3-acryl amidomethyl-anisaldehyde, diacetone acrylate, acetonyl acrylate, diacetone methacrylate, acetoacetoxyethylmethacrylate, 2-hydroxypropylacrylate acetylacetate, and butanediolacrylate acetylacetate and the like, and combinations thereof.

In some approaches, the film-forming binder may include about 0 to about 20 weight percent of the optional ketone-functional monomer units, and in other approaches, about 0 to about 12 weight percent, and in yet other approaches, about 1 to about 16 weight percent or 2 to about 12 weight percent as a percentage of the acrylic phase.

The film-forming binder resins herein may also include other optional monomers polymerized into the polymer backbone as needed for a particular application. For instance, the copolymer may further include ureido monomers, amino monomers, sulfonate monomers or surfactants, silane monomers, phosphate monomers or surfactants, carboxyl monomers or surfactants, and combinations thereof. In some approaches, the copolymer may further include vinyl monomers such as allyl imidazolidinone, allyl acetoacetates, allyl epoxies, epoxy acrylates, carbonyl monomers, other sulfonates, other phosphonates, vinyl phosphonate, allyl hydroxypropyl sodium sulfonate, allyloxy hydroxypropyl sodium sulfonate, and combinations thereof as needed for a particular application. In some approaches, for instance, the other monomers may each be present in the acrylic copolymer in amounts up to about 10 weight percent, and in other approaches, about 0.1 to about 5 weight percent, in other approaches, about 0.5 to about 2 weight percent, but the amounts may vary depending on the particular application. In other approaches, the other or additional monomers may each be included in the polymer backbone in amounts less than about 1 weight percent.

The coating compositions herein, in some approaches, may have about 20 to about 75 weight percent, or about 25 to about 60 weight percent, or about 35 to about 50 weight percent film forming binder based on the total weight of the coating composition. The film forming binder may be selected based on needs of the end-use applications, with an all-acrylic or styrene-acrylic binder being preferred.

Pigments. The waterborne coating compositions of the present disclosure may also optionally include one or more opacifying pigments. The term "pigment" means an inorganic particulate material having light scattering characteristics in the spectral region from 300 nm to 750 nm and especially in the visible spectral region from 380 nm to 700 nm, and a surface energy and particle size suitable for use in paints and other coating compositions. One or more pigments may be incorporated separately as a particle, in a slurry, or as a particle-polymer complex. In some approaches, the pigment is titanium dioxide, which may comprise anatase titanium dioxide, rutile titanium dioxide, Brookite titanium dioxide, or mixtures thereof with or without other pigments. In some approaches, the rutile titanium dioxide is surface treated with an inorganic oxide, such as silica (SiO2), alumina, zirconia, or combinations thereof. In some approaches, iron oxide may be used as a pigment. Generally, the opacifying pigments, such as titanium dioxide, have a particle size less than a micron, such as about 0.2 to about 0.3 microns in diameter and provided in powder form, or in an aqueous slurry. Exemplary commercially available titanium dioxide particles and those provided in slurry or dry forms, e.g., KRONOS™ 1071, 2020, 2044, 2090, 2101, 2102, 2131, 2160, 2210, 2310, 4102, 4310 and 4311 from Kronos, Inc., TIONA T M 595 and 596i from Millennium Specialty Chemicals Inc. TIPURE™ TS-6200, R-706, R-741, R-746, R-900, R-902+, R 931 and R-960 from E. I. duPont de Nemours and Company, TRONOX™ CR-813, CR 15 813S, CR-826, CR-826S, CR-828, CR-834 and CR-880 from Tronox Corporation, and products from other suppliers including Bluestar New Chemical Materials Co., Ltd., Hebei Chuanghui Chemicals Co., Ltd., Henan Billions Chemicals Co., Ltd., Ishihara Sangyo Kaisha, Ltd., Nanjing Hengsiman Chemical Co., Ltd., Pangang Titanium Industry Co., Ltd., Qingdao Gracecorp Co., Ltd., Sakai Chemical Industry Co., Ltd., Shanghai Yuejiang 20 Titanium Chemical Manufacturer Co., Ltd., Shijiazhuang Kelichuangxin Chemicals Co., Ltd. and Xuzhou Zhonglian Chemical Technology Co., Ltd. and mixtures thereof.

In some approaches, the waterborne compositions herein may include about 10 to about 30 weight percent of pigment, about 15 to about 20 weight percent, or about 18 to about 25 weight percent of pigment based on the total amount of components in the coating composition. In other approaches, the waterborne coating compositions herein may include a pigment present in an amount of about 3 to about 60 PVC, preferably about 10 to about 50 PVC, and more preferably, about 20 to about 45 PVC. The amount of pigment may vary depending on the application. For instance, the PVC of architectural exterior coatings may be about 10 to about 50, the PVC of masonary coatings may be about 10 to about 40, the PVC of a water-based metal coating may be about 10 to about 40, the PVC of stains may be about 10 to about 40, and extra while formulations may contains more PVC, such as about 20 to about 45.

Optional Additives. The water-borne coating compositions of the present disclosure may also include other optional additives as needed for typical applications. For instance, the water-borne coating composition of the present disclosure is produced using techniques known to those skilled in the art of manufacturing paint or coatings. In addition to the film-forming binder and the composite particles, the water-borne coating compositions herein may contain conventional additives including, but not limited to an extender, a wet-state preservative, a rheology modifier, a colorant, a mildewcide, a surfactant, a dispersant, a defoamer, a coalescent, a plasticizer, an anti-settling agent, a pH modifier, a UV absorbent, a crosslinker, thickeners, coalescing aids, biocides, anti-foaming agents, freeze-thaw additives, matting agents, and the like. If needed for a particular application, the compositions may include inorganic or mineral extender matting agents such as calcium carbonate, silicates, diatomaceous earth, clay, asbestine, barytes, silica, mica, and microspheres (glass, ceramic, or polymeric, and can be filled or hollow). It should also be appreciated that in addition to the opacifying pigment, small amounts of other pigments or colorants may be used to provide desired coloration or to confer other optical effects.

In approaches or embodiments, the water-based coating compositions herein may include a wet-state preservative. If included, the compositions may include from regulatory-compliant amounts of wet state preservative sufficient to prevent microbial contamination during the shelf-life of the coating composition. Suitable wet-state preservatives include n-octyl-4-isothiazolin-3-one (OIT); n-butyl-benzisothiazolinone (BBIT), 2-Methyl-1,2-thiazol-3-one (MIT), 5-Chloro-2-methyl-4-isothiazolin-3-one (CMIT), Dichloro-2-octyl-1,2-thiazol-3(2H)-one (DCOIT), and 1,2-benzisothaiazolin-3-one (BIT). 1,2-Dimethylol-5,5-dimethyldantoin (DMDMH), 2-Bromo-2-nitropropane-1,3-diol (BNP), 2,2-Dibromo-3-nitrilopropionamide (DBNPA), Poly (hexamethylene biguanide hydrochloride (PHMB), N-methyl benzisothiazolin-3-one (MBIT), 1-(3-chlorallyl-3, 5,7-triazo-1-az-niaadamantane chloride, Ethyleneglycol hemiformal, (ethylenedioxy)dimethanol, Tetramethylolacetylene diurea, and Dibromocyanobutan, and combinations thereof. In some approaches or embodiments, the water-based coating compositions herein may further include a dry-film preservative or mildewcide. If included, the compositions may include about 0 to about 2.0 weight percent of a mildewcide, preferably about 0.2 to about 1.5 weight percent of a mildewcide based on the total weight of the coating composition. Suitable mildewcides may include, but are not limited to, one or more of methyl 2-benzimidazolecarbamate (BCM), 3-iodo-2-proynyl butyl carbamate (IPBC), zinc pyrithione, sodium pyrithione, carbendazim, chlorothalonil, an isothiazolinone, tetrachloroisophthalonitrile, sodium omadine, N-Butyl-1,2-benzisothiazolin-3-one (BBIT), 2,n-Octyl-3-isothazolin-3-one (OIT), Alkyl dimethyl benzyl ammonium chloride, Copper Pyrithione (CuPT), thiabendazole, tebuconazole, propiocanazole, Thiabendendazole, Asozystrobin, Fludioxonil, and combinations thereof.

As noted above, the zinc oxide in the composite particles may enhance of the efficiency of any mildewcide and, as such, the coating compositions herein may include reduced levels of such mildewcides when used with the composite particles herein. In approaches or embodiments, the coating compositions herein may include no more than about 0.5 pounds of methyl-2-benzimidazolecarbamate per 100 gallons coating composition, or about 0.3 pounds of methyl-2-benzimidazolecarbamate per 100 gallons coating composition. Likewise, the coating compositions herein may include no more than about 0.1 pounds of 3-iodo-2-propynyl butyl carbamate per 100 gallons coating composition; or no more than about 0.2 pounds of 3-iodo-2-propynyl butyl carbamate per 100 gallons coating composition, or no more than about 0.9 pounds of 3-iodo-2-propynyl butyl carbamate per 100 gallons coating composition, or no more than about 1.25 pounds of 3-iodo-2-propynyl butyl carbamate per 100 gallons coating composition. The coating compositions may include no more than about 0.45 pounds of 3-(3,4-dichlorphenyl)-1,1-dimethylurea per 100 gallons of coating composition, or no more than about 0.75 pounds of 3-(3,4-dichlorphenyl)-1,1-dimethylurea) per 100 gallons coating composition, or no more than about 1.95 pounds 3-(3,4-dichlorphenyl)-1,1-dimethylurea) per 100 gallons coating composition. The coating compositions may include no more than about 0.12 pounds of zinc pyrithione per 100 gallons coating composition, or no more than about 0.24 pounds of zinc pyrithione per 100 gallons coating composition, or no more than about 0.6 pounds of zinc pyrithione per 100 gallons coating composition. The coating compositions may include no more than about 0.3 pounds of sodium 2-pyridinethiol-1-oxide per 100 gallons coating composition. As shown in the Examples below, the coating compositions included enhanced levels of mildew resistance when the compositions include the composite particles with or optionally without midewcides.

In yet other approaches, the coating compositions herein may have a weight ratio of the zinc oxide provided by the composite particles to the mildewcide of about 1:1 to about 8:1; about 1.2:1 to about 7.5:1; about 1.3:1 to about 3.5:1; about 1.2:1 to about 3:1; or about 3:1 to about 7.1:1. The ratio may vary depending of the application and substrate. As shown below in the Examples, zinc oxide provided by the composite particles enhances the mildew resistance of any mildewcide.

Glossary of Terms

Additives refer to a general category of components or other raw materials that may be added to the coatings herein to promote various properties. Examples include, but are not limited to, surfactants, defoamers, biocides, mildewcides, algaecides, thickeners, anti-settling agents, pH buffers, corrosion inhibitors, driers, and/or anti-skinning agents.

Glass Transition Temperature or Tg generally refers to a temperature region where an amorphous polymer transitions from a hard, glassy material to a softer, rubbery material. Typically, this transition is reversible. Tg is measured by differential scanning calorimetry (DSC) and/or dynamic mechanical analysis (DMA), such as with a TA Instruments Q200 differential scanning calorimeter or the like instrument. To measure Tg using DSC, a sample deposited on a panel first is baked in a Fisher ISOTEMP™ electric oven for 20 minutes at 149° C. (300° F.) to remove volatile materials. After cooling to room temperature, samples are scraped from the panels, weighed into standard sample pans and analyzed using the standard DSC heat-cool-heat method. The samples were equilibrated at −60° C., then heated at 20° C. per minute to 200° C., cooled to −60° C., and the heated again at 20° C. per minute to 200° C. Glass transitions are calculated from the thermogram of the last heat cycle. The glass transitions are measured at the inflection point of the transition. Preferably, Tg is measured through DSC.

Melting temperature (or Tfusion) generally refers to the temperature at which the crystalline portion of a polymer transitions from the solid state to a liquid state. Tfusion is measured by differential scanning calorimetry (DSC), such as with a TA Instruments Q200 differential scanning calorimeter or the like instrument. To measure Tfusion using DSC, a sample deposited on a panel first is baked in a Fisher ISOTEMP™ electric oven for 20 minutes at 149° C. (300° F.) to remove volatile materials. After cooling to room temperature, samples are scraped from the panels, weighed into standard sample pans and analyzed using the standard DSC heat-cool-heat method. The samples were equilibrated at −60° C., then heated at 20° C. per minute to 200° C., cooled to −60° C., and the heated again at 20° C. per minute to 200° C. Tfusion is calculated from the thermogram of the last heat cycle and recorded as the thermogram peak.

Drop melting point is a measure of the temperature at which a wax becomes sufficiently fluid to drop from a thermometer under controlled conditions. Drop melting point is measured according to ASTM D127.

The term Volatile Organic Compound or VOC generally refers to organic compounds that have a high vapor pressure at room temperature as is defined by the United States Environmental Protection Agency (EPA) under 40 Code of Federal Regulations sec. 51.100. VOC as reported herein is measured according to ASTM D6886 (Standard Test Method for Determination of the Weight Percent Individual Volatile Organic Compounds in Waterborne Air-dry Coatings by Gas Chromatography), which uses methyl palmitate as a marker. A compound that elutes prior to methyl palmitate is a VOC, and compound that elutes after methyl palmitate is not a VOC. As used herein, compounds that are not VOCs include those that elute after methyl palmitate and also compounds exempt from definition as a VOC under EPA regulations. VOC level is reported as the weight of the VOC per volume of the coating solids in grams/L. As used herein, low VOC or substantially free of VOCs means less than about 50 g/L, in other approaches, less than about 10 g/L, in yet other approaches, less than about 5 g/L, and in yet other approaches, no VOCs.

As used herein, without the need for, without substantial levels of, in the absence of, or substantially free of, substantially none, substantially no, or free-of generally means (unless apparent from the context of the discussion) the coating compositions herein have less than about 1 weight percent, in other approaches, less than about 0.5 weight percent, in other approaches, less than about 0.2 weight percent, and in yet other approaches, none of the particular component or additive. As used herein, essentially free of means no intentionally added amount of an identified material.

The terms "polymer" and "polymeric material" include, but are not limited to, organic homopolymers, copolymers, such as for example, block, graft, statistical, including random, and alternating copolymers, terpolymers, etc., and blends and modifications thereof. Furthermore, unless otherwise specifically limited, the term "polymer" shall include all possible geometrical configurations of the material. These configurations include, but are not limited to, isotactic, syndiotactic, and atactic symmetries.

As used herein, (meth)acrylate monomer(s) or monomer unit(s) include both acrylate monomer(s) and monomer unit(s) and methacrylate monomer(s) and monomer unit(s) as well as functionalized (meth)acrylate monomer(s) or monomer unit(s) suitable for incorporation into the functionalized polymers or oligomers disclosed herein. Functional moieties may also bear other crosslinking groups, photo-reactive groups, anti-fouling agents, light absorbers, anti-corrosion agents, and the like as needed for a particular application or use.

As used herein, functionalized, functionality, or functional group means a group or moiety of a larger molecule or polymer reactive with another group or atom.

Opacity or hiding (in some approaches) generally refers to the ability of a film to scatter light based on the thickness of the film. The Opacity is often expressed as S/mil and may be in the form of Kubelka-Munk scattering coefficients as determined using a modification of ASTM D 2805-70 as described in J. E. Mchutt and H. L. Ramsay in American Paint and Coatings Journal, April 1988, p. 46 by the weight drawdown method, which is incorporated herein by reference.

Sheen may also sometimes be referred to as gloss. In a coating, a gloss finish indicates that the surface which has a coating applied to it (i.e., is finished) it is shiny or glass-like. The gloss of a surface is described as the reflection of light from the surface that is independent of color. ASTM D523 may be used to measure sheen. The prescribed angle at which light is reflected off the surface may vary, but for the purposes of this disclosure to measure 85 Sheen, is measured at 85° relative to the surface reflecting the light. ASTM D523 may also be used to describe 60 Gloss, which is measured at 60° relative to the surface reflecting the light. Gloss may also refer to the gloss intensity measured at 20, 60, or 85 degrees and is determined according to ASTM D323. One of skill in the art is able to determine relative levels of gloss (low versus high) in context of each coating.

A coating refers to any decorative or protective layer formed by applying a thin film of a coating composition herein to a substrate. Coating compositions include any paint, stain, lacquers, and the like. A coating composition may contain a solvent (which can include a volatile component derived from a petroleum distillate for a solvent-based paint, or a low VOC, or no-VOC, or water for a water-based paint or composition), a binder polymer, and optionally, a pigment, fillers (such as an extender or a plurality of extenders of different sizes) and one or more additives, which may impart different functionality to the paint or final coating.

A "paint" refers to a coating composition including pigment and film-forming binder that, when applied to form a thin (e.g., approximately 100 μm) wet thickness coating film on a freshly-sanded smooth wood surface will, when dried, hide or substantially hide the wood grain and will present a new surface with its own appearance.

A "stain" refers to a coating composition including optional pigment and film-forming binder that, when applied to form a thin (e.g., approximately 100 μm) wet thickness coating film on a freshly-sanded smooth wood surface will, when dried, does not hide the wood grain of the wood surface.

Pigment volume concentration or PVC refers to a number that represents the volume of non-extender inorganic pigment compared to the volume of all solids. In the field of paints and coatings, PVC is a useful measure because the binder (non-pigment) acts as the material to unite all the pigment and other raw materials into the paint and the PVC value ensures there is enough binder to enable the paint or coating to adhere properly to whatever it has been applied over in addition to containing all of the other components of the paint or coating. Since inorganic pigments often provide hide by white coloration, such as titanium dioxide, the amount of pigment present in a coating composition tends to increase for extra white coatings compared to darker colorations like deep and ultra deep base coatings. In addition, the amount of pigment also tends to make the coating less glossy. Thus, if a paint or coating has no pigment at all, it will usually be very glossy and for an ultra-deep paint or clear stain formulation. Flat paints commonly have a very high pigment loading and have high PVCs (usually in the range from about 55% up to about 80%). Another non-limiting exemplary range of PVC in which pigment can be loaded is from about 60% to about 75%. Primers and undercoats vary from 30% to about 50% PVC as do semi-gloss, satin, and low sheen paints. PVC may be expressed as a percentage. For example, if a coating has a PVC of 30, then 30% of the coating composition are pigment solids, and 70% of the coating composition is binder solids on a volume basis.

Mildew resistance is measured on a dried coating obtained from a 1 inch nylon brush applied by two coats on both sides of a pine or birch substrate (about 350 ft2/gallon) at room temperature (25° C.) and room humidity and dried for 4 days at the room temperature and humidity, then pre-weathered for 3 weeks pursuant to ASTM G154-4, with cycles of 4 hour irradiance at 0.89 W/m2*nm with a UVA-340 bulb and 4 hours condensation cycle at 50° C. and then aged in a mildew cabinet pursuant to ASTM D3273. Mildew resistance is then assessed visually by percentage mildew defacement of the coating surface.

Unless otherwise specified, all measurements herein are made at 23±1° C. and 50% relative humidity. The dimensions and values disclosed herein are not to be understood as being strictly limited to the exact numerical values recited. Instead, unless otherwise specified, such as dimension is intended to mean both the recited value and a functionally equivalent range surrounding that value. All ranges noted are intended to mean any endpoint within that range. For example, a dimension disclosed as "40 mm" is intended to mean "about 40 mm".

It is noted that, as used in this specification and the appended claims, the singular forms "a," "an," and "the," include plural referents unless expressly and unequivocally limited to one referent. Thus, for example, reference to "an antioxidant" includes two or more different antioxidants. As used herein, the term "include" and its grammatical variants are intended to be non-limiting, such that recitation of items in a list is not to the exclusion of other like items that can be substituted or added to the listed items For the purposes of this specification and appended claims, unless otherwise indicated, all numbers expressing quantities, percentages or proportions, and other numerical values used in the specification and claims, are to be understood as being modified in all instances by the term "about," which includes usual uncertainty in measurement and usual variation in raw material composition. Accordingly, unless indicated to the contrary, the numerical parameters set forth in the following specification and attached claims are approximations that can vary depending upon the desired properties sought to be obtained by the present disclosure.

When quantities or numbers are present in the specification and claims, any ranges defined by such numbers includes the endpoints of the stated range.

It is to be understood that each component, compound, substituent or parameter disclosed herein is to be interpreted as being disclosed for use alone or in combination with one or more of each and every other component, compound, substituent or parameter disclosed herein.

It is further understood that each range disclosed herein is to be interpreted as a disclosure of each specific value within the disclosed range that has the same number of significant digits. Thus, for example, a range from 1 to 4 is to be interpreted as an express disclosure of the values 1, 2, 3 and 4 as well as any range of such values.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range. That is, it is also further understood that any range between the endpoint values within the broad range is also discussed herein. Thus, a range from 1 to 4 also means a range from 1 to 3, 1 to 2, 2 to 4, 2 to 3, and so forth.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

Reference throughout this specification to "some approaches" or "an approach" or "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

Certain terminology is used herein for convenience only and is not to be taken as a limitation on the present disclosure.

EXAMPLES

The following examples demonstrate the preparation of copolymers and waterborne compositions such as those described herein above, as well as non-inventive examples for comparison. The examples are intended to be representative of the polymers that can be made and are not intended to limit the scope of the present disclosure to the specific illustrative examples disclosed below. All percentages, ratios, and amounts in this disclosure and the Examples are by weight unless the context of discussion herein suggests otherwise.

Example 1

Coating compositions configured for architectural paint applications were evaluated for mildew resistance after the dried coating has been pre-weathered for 3 weeks pursuant to ASTM G154-4 and subjected to a mildew cabinet pursuant to ASTM D3273 as described above. The coating compositions were waterborne coating compositions based on a single-stage acrylic polymer emulsion, with zinc oxide separate from a composite particle with wax, and zinc oxide in a composite particle with wax, with or without additional mildewstat as shown in the amounts shown in Table 1.

TABLE 1

Additions to Coating Compositions in Lbs/100 gallons Coating Composition

| Type | Zinc Oxide Separate from Composite Particle | Zinc Oxide in Composite Particle | Wax | Mildewcide 1 | Mildewcide 2 |
| --- | --- | --- | --- | --- | --- |
| Control | 20 | — | — | 5 | 0.25 |
| Negative control | — | — | — | — | — |
| A | — | 12.7 | Rice Bran | 5 | 0.25 |
| B | — | 11.6 | Polyethylene | 5 | 0.25 |
| C | 10 | 6.4 | Rice Bran | 5 | 0.25 |
| D | 10 | 5.8 | Polyethylene | 5 | 0.25 |
| E | 20 | — | — | — | — |
| F | — | 12.7 | Rice Bran | — | — |
| G | — | 11.6 | Polyethylene | 5 | 0.25 |

In the coating compositions of Table 1, the zinc oxide raw was uncoated zinc oxide having a median particle size of 0.36 microns. The zinc oxide in the composite particle was either (1) zinc oxide having a specific area of 3 to 4 $m^2$/gram in a composite particle with rice bran wax having a Tfusion of 77° C. to 82° C. with the particles averaging about 80 weight percent zinc oxide and about 20 weight percent rice bran wax or (2) zinc oxide having a specific area of 3 to 4 $m^2$/gram in a composite particle with a polyethylene wax having a Tfusion of 109° C. to 115° C. with the particles average about 70 weight percent zinc oxide and about 30 weight percent wax. Mildewcide 1 was based on methyl 2-benzimidazolecarbamate. Mildewcide 2 was based on zinc pyrithione. Table 2 provides the percent of mildew coverage (average of three samples) for 5 weeks of aging and shows sample B providing the best mildew resistance.

TABLE 2

Percent Mildew Coverage (ASTM 3273-21)

| Type | Week 1 | Week 2 | Week 3 | Week 4 | Week 5 |
|---|---|---|---|---|---|
| Contol | 0 | 7 | 12 | 28 | 100 |
| Negative control | 22 | 83 | 100 | 100 | 100 |
| A | 2 | 7 | 58 | 100 | 100 |
| B | 0 | 10 | 11 | 42 | 50 |
| C | 0 | 3 | 12 | 75 | 100 |
| D | 3 | 2 | 15 | 75 | 100 |
| E | 2 | 3 | 28 | 75 | 100 |
| F | 0 | 25 | 100 | 100 | 100 |
| G | 3 | 35 | 100 | 100 | 100 |

Example 2

Coating compositions configured for architectural deck stain applications were evaluated for mildew resistance after the dried coating has been pre-weathered for 3 weeks pursuant to ASTM G154-4 and subjected to a mildew cabinet pursuant to ASTM D3273 as described above. The coating compositions were waterborne coating compositions based on a two-stage acrylic emulsion, the coating compositions having the same composition except as noted in Table 3 below.

TABLE 3

Additions to Coating Compositions in Lbs/100 gallons Coating Composition

| Type | Zinc Oxide Separate from Composite Particle | Zinc Oxide in Composite Particle | Wax | Mildewcide 1 |
|---|---|---|---|---|
| Control | 25 | — | — | 2.3 |
| Negative control | — | — | — | — |
| A' | — | 16 | Rice Bran | 2.3 |
| B' | — | 14.5 | Polyethylene | 2.3 |
| C' | 12.5 | 8 | Rice Bran | 2.3 |
| D' | 12.5 | 7.3 | Polyethylene | 2.3 |
| E' | 25 | — | — | — |
| F' | — | 16 | Rice Bran | — |
| G' | — | 14.5 | Polyethylene | — |
| H' | — | 30 | Rice Bran | 2.3 |
| I' | — | 25 | Polyethylene | 2.3 |

In the coating compositions of Table 3, the zinc oxide raw was uncoated zinc oxide having a median particle size of 0.36 microns. The zinc oxide in the composite particle was either (1) zinc oxide having a specific area of 3 to 4 $m^2$/gram in a composite particle with rice bran wax having a melt temperature of 77° C. to 82° C. with the particles averaging about 80 weight percent zinc oxide and about 20 weight percent rice bran wax or (2) zinc oxide having a specific area of 3 to 4 $m^2$/gram in a composite particle with a polyethylene wax having a melt temperature of 109° C. to 115° C. with the particles average about 70 weight percent zinc oxide and about 30 weight percent wax. Mildewcide 3 was based on 3-iodo-2-propynyl butyl carbamate. Table 4 provides the mildew resistance of the coatings for 10 weeks showing that composition A' as having the best mildew resistance.

TABLE 4

Percent Mildew Coverage (ASTM 3273-21)

| Type | Week 1 | Week 2 | Week 3 | Week 5 | Week 6 | Week 7 | Week 8 | Week 9 | Week 10 |
|---|---|---|---|---|---|---|---|---|---|
| Contol | 3.3 | 0 | 0 | 23.3 | 23.3 | 28.3 | 58.3 | 58.3 | 58.3 |
| Negative control | 1.7 | 100 | 100 | 100 | 100 | 100 | 100 | 100 | 100 |
| A' | 0 | 0 | 0 | 0.3 | 0.3 | 2.5 | 5.0 | 5.0 | 12.5 |
| B' | 0 | 0 | 0 | 10.0 | 13.3 | 21.7 | 48.3 | 48.3 | 50.0 |
| C' | 0 | 1.7 | 0 | 8.3 | 8.3 | 15.0 | 58.3 | 53.3 | 53.3 |
| D' | 0 | 0 | 0 | 33.3 | 66.7 | 667 | 83.3 | 83.3 | 83.3 |
| E' | 0 | 0 | 0 | 100 | 100 | 100 | 100 | 100 | 100 |
| F' | 0 | 0 | 0 | 40 | 40 | 40 | 40 | 40 | 40 |
| G' | 0 | 0 | 11.7 | 100 | 100 | 100 | 100 | 100 | 100 |

Coating compositions described in Table 3 were subjected to pH, 60° gloss, and 85° sheen tests following mixing. The data shows that incorporation of metal oxides as part of a composite particle do not significantly impact pH, and affect gloss and sheen only at high loading of >25 lbs/100 gallons coating composition.

TABLE 5 pH, 60 Gloss (ASTM D523), 85 Sheen (ASTM D523)

| Type | pH | 60 gloss | 85 sheen |
|---|---|---|---|
| Contol | 9.2 | 6.3 | 7 |
| A' | 9.2 | 6.6 | 7.1 |
| B' | 9.2 | 5.7 | 4.1 |
| H' | 9.2 | 6.1 | 6.4 |
| I' | 9.2 | 5 | 3.3 |

Example 3

Coating compositions configured for masonry paint applications were evaluated for mildew resistance after the dried coating has been pre-weathered for 3 weeks pursuant to ASTM G154-4 and subjected to a mildew cabinet pursuant to ASTM D3273 as described above. The coating compositions were based on a waterborne two-stage styrene-acrylic emulsion, the coating compositions having the same composition except as noted in Table 6 below.

TABLE 6

Additions to Coating Compositions in Lbs/100 gallons Coating Composition.

| Type | Zinc Oxide Separate from Composite Particle | Zinc Oxide in Composite Particle | Wax | Mildewcide |
|---|---|---|---|---|
| Contol | 25 | — | — | — |
| Negative control | — | — | — | — |
| A" | — | 16 | Rice Bran | — |
| B" | — | 14 | Polyethylene | — |
| C" | 12.5 | 8 | Rice Bran | — |
| D" | 12.5 | 7.3 | Polyethylene | — |

In the coating compositions of Table 5, the zinc oxide separate from composite particles, zinc oxide in a composite particle with wax, and mildewcide 1 were the same materials as in Example 1. The composite particle was either (1) zinc oxide having a specific area of 3 to 4 $m^2$/gram in a composite particle with rice bran wax having a melt temperature of 77° C. to 82° C. with the particles averaging about 80 percent zinc oxide and about 20 percent rice bran wax or (2) zinc oxide having a specific area of 3 to 4 $m^2$/gram in a composite particle with a polyethylene wax having a melt temperature of 109° C. to 115° C. with the particles average about 70 weight percent zinc oxide and about 30 weight percent wax. Although the compositions were configured for masonary applications, mildew resistance was measured using a birch or pine substrate. Table 7 provides the mildew resistance showing that B" as having the best mildew resistance.

TABLE 7

Percent Mildew Coverage (ASTM 3273-21)

| Type | Week 1 | Week 2 | Week 3 | Week 4 |
|---|---|---|---|---|
| Contol | 0 | 43.3 | 100 | 100 |
| Negative control | 66.7 | 91.7 | 100 | 100 |
| A" | 11.7 | 75 | 100 | 100 |
| B" | 10 | 15 | 100 | 100 |
| C" | 1.7 | 45.0 | 100 | 100 |
| D" | 8.3 | 75.0 | 100 | 100 |

Illustrative embodiments have been described, hereinabove. It will be apparent to those skilled in the art that the above compositions and methods may incorporate changes and modifications without departing from the general scope of this disclosure. It is intended to include all such modifications and alterations within the scope of the present disclosure. Furthermore, to the extent that the term "includes" is used in either the detailed description or the claims, such term is intended to be inclusive in a manner similar to the term "comprising" as "comprising" is interpreted when employed as a transitional word in a claim.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A water-based coating composition comprising a film-forming binder resin;
   composite particles including one or more waxes and a metal oxide selected from the group consisting of zinc oxide, magnesium oxide, and silver oxide, wherein the composite particles are present in the water-based coating composition at a concentration of about 10 to about 25 lb/gallon;
   a pigment present in an amount of about 3 to about 60 PVC; and
   wherein the composite particles are discrete particles that include the one or more waxes on an outer surface thereof of the metal oxide.

2. The water-based coating composition of claim 1, wherein the metal oxide is zinc oxide.

3. The water-based coating composition of claim 1, wherein the metal oxide is magnesium oxide.

4. The water-based coating composition of claim 1, wherein the metal oxide is silver oxide.

5. The water-based coating composition of claim 1, wherein the wax of the composite particles has a solubility in water at 25° C. of less than about 10 mg/liter.

6. The water-based coating composition of claim 1, wherein the wax is selected from (i) esters of fatty acids with fatty alcohols, fatty aldehydes, fatty triterpene alcohols, fatty steroid alcohols, or mixtures thereof; (ii) polyolefin waxes, (iii) fatty amides; (iv) metal esters of fatty acids; (v) derivatives thereof, or (vi) mixtures thereof.

7. The water-based coating composition of claim 1, wherein the molecules forming the wax have 16 or more carbons.

8. The water-based coating composition of claim 1, wherein the wax is selected from Carnauba wax, beeswax, rice bran wax, montan wax, paraffin wax, microcrystalline paraffin wax, polyethylene wax, polypropylene wax, Fischer-Tropsch paraffin wax, diketone wax, calcium stearate, magnesium stearate, zinc stearate, aluminum stearate, derivatives thereof, and mixtures thereof.

9. The water-based coating composition of claim 1, wherein the wax has a drop melting point of about 60° C. to about 250° C. as measured by ASTM D127.

10. The water-based coating composition of claim 1, wherein the wax has a Tfusion of about 70° C. to about 160° C.

11. The water-based coating composition of claim 1, wherein the pigment is titanium dioxide.

12. The water-based coating composition of claim 1, wherein the water-based coating composition further includes one or more additives selected from an extender, a wet-state preservative, a rheology modifier, a colorant, a mildewcide, a surfactant, a dispersant, a defoamer, a coalescent, a plasticizer, an anti-settling agent, a pH modifier, a UV absorbent, a crosslinker, or combinations thereof.

13. The water-based coating composition of claim 1, wherein water-based coating composition further includes zinc oxide separate from the composite particles.

14. The water-based coating composition of claim 13, wherein a weight ratio of metal oxide in the composite particles to metal oxide separate from the composite particles is about 1:7 to about 4:5.

15. The water-based coating composition of claim 13, wherein the metal oxide in the composite particles has a mean particle diameter smaller than a mean particle diameter of the separate metal oxide.

16. The water-based coating composition of claim 1, wherein the water-based coating composition includes about 2 to about 26 lb/gallon of metal oxide in the composite particles and about 0 to about 25 lb/gallon of metal oxide separate from the composite particles.

17. The water-based coating composition of claim 1, wherein the water-based coating composition is a stain, an exterior paint, a metal coating, a concrete coating, or a masonry coating.

18. The water-based coating composition of claim 1, wherein the composite particles have a particle size ranging from a D10 at least about 0.3 microns to a D90 of about 15 microns or less.

19. The water-based coating composition of claim 1, wherein the composite particles include at least about 30 weight percent of the metal oxide based on the total weight of the composite particles.

20. The water-based coating composition of claim 1, wherein the composite particles include about 90 weight percent or less of the metal oxide based on the total weight of the composite particles.

21. The water-based coating composition of claim 1, wherein the composite particles include at least about 10 weight percent of wax based on the total weight of the composite particles.

22. The water-based coating composition of claim 1, wherein the composite particles include about 70 weight percent or less of wax based on the total weight of the composite particles.

23. The water-based coating composition of claim 1, wherein the composite particles include metal oxide substantially encapsulated by the wax.

24. The water-based coating composition of claim 1, wherein a dried coating applied to a pine or birch substrate has about 25 percent or less mildew coverage for at least 3 weeks of aging in a mildew cabinet pursuant to ASTM D3273 and when the dried coating has been pre-weathered for 3 weeks pursuant to ASTM G154-4, with cycles of 4 hour irradiance at 0.89 W/(m$^2$*nm) with a UVA-340 bulb and 4 hours condensation cycle at 50° C., wherein the coating composition includes less than about 10 lb zinc oxide separate from composite particles per 100 gallons coating composition.

25. The water-based coating composition of claim 1, wherein the film-forming binder resin is a (meth) acrylic latex, a styrene-acrylic latex, a urethane modified acrylic latex, or combinations thereof.

26. A coated substrate comprising a coating cured from the coating composition of claim 1 applied directly or indirectly on a substrate selected from the group consisting of wood, aluminum, steel, concrete, masonry, siding, and drywall.

\* \* \* \* \*